May 23, 1967   D. L. SHEPHARD   3,320,653
CUT-OFF BLADE
Filed May 23, 1966

INVENTOR
DONALD L. SHEPHARD

BY *Cullen, Sloman, & Cantor*
ATTORNEYS

United States Patent Office 3,320,653
Patented May 23, 1967

3,320,653
CUT-OFF BLADE
Donald L. Shephard, 11500 Lambs Road,
Memphis, Mich. 48041
Filed May 23, 1966, Ser. No. 552,185
4 Claims. (Cl. 29—95)

The present invention relates to improvements in cutting off blades.

Heretofore, it is known as the cutting proceeds with respect to a rotating workpiece, for example, the depth of penetration between the tool past faces of the work being severed increases and there frequently is no room for lateral chip expansion and, consequently, there is a greater tendency for the chips or cuttings to pack in the cut formed by the blade. This results in unnecessary and excessive heating up of the cutting blade and deterioration thereof sooner than would otherwise be expected if the heating condition and the handling of chips could be better controlled.

In other cut off blades of the present type this has been recognized wherein blades have been provided having a transverse cutting edge at the forward portion thereof which is hollow ground or slightly depressed transversely to thus provide a curved cutting surface terminating in a pair of sharp points at the outer edges thereof. The outer points of the cutting edge are the important points since these must carry substantially all of the heat from the cutting action plus the heat of chip friction.

It is, therefore, an object of the present invention to provide an improved cutting edge which will reduce and minimize chip friction and reduce and minimize heat during the cutting operation.

It is recognized that employing a hollow ground top surface as has been done in the art a chip is produced which is partially curved. Accordingly, the frictional heat of cutting when applied to the cutting action causes the chip to curl, thus, to be of reduced dimension to minimize packing and to provide for disposition of the chip from the cut groove formed in the workpiece.

It is a primary object of the present invention to provide an improved cutting edge by forming in the top edge face of the head of the cutting blade a series of cutting surfaces which are individually hollow ground and curved and which include outer cutting surface portions and a central portion, all being hollow ground and with the respective end portions of the outer portions and the central portion terminating in cutting points which are substantially co-planar and wherein there is provided during the cut three individual chips each of which tend to curl for convenient ejection from the groove being cut in the workpiece for reducing friction to a very minimum.

These and other objects will be seen from the following specification and claims in conjunction with the appended drawing in which:

It will be understood that the above drawing illustrates merely a preferred embodiment of the invention, and that other embodiments are contemplated within the scope of the claims hereafter set forth.

Figure 3:
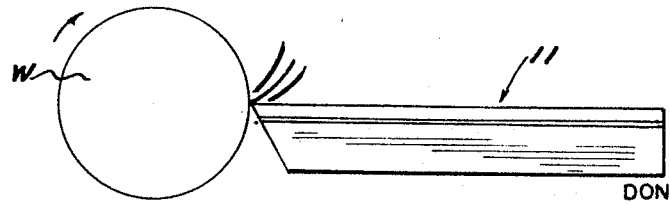
FIG. 3 is a schematic side elevational view showing the cutting tool as related to rotative workpiece being cut off.

Referring to the drawing, the present cutting off blade generally indicated at 11, FIG. 3, normally arranged at right angles to the axis of rotation of the workpiece W, and during rotation of the said workpiece is fed radially thereinto at the point where part of the work is being severed from another part.

The present cutting off blade includes an elongated body 12 of uniform cross-section throughout its length and upon one side thereof the slightly enlarged head 13, also of uniform cross-section, which extends along one side of the body throughout its length, FIG. 3.

Figure 1:
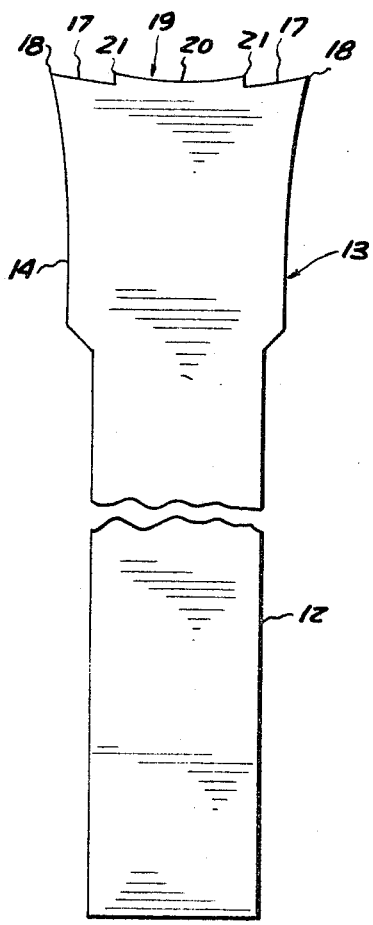
FIG. 1 is a fragmentary, partially broken away end elevational view of the present cutting off blade.
Figure 2:
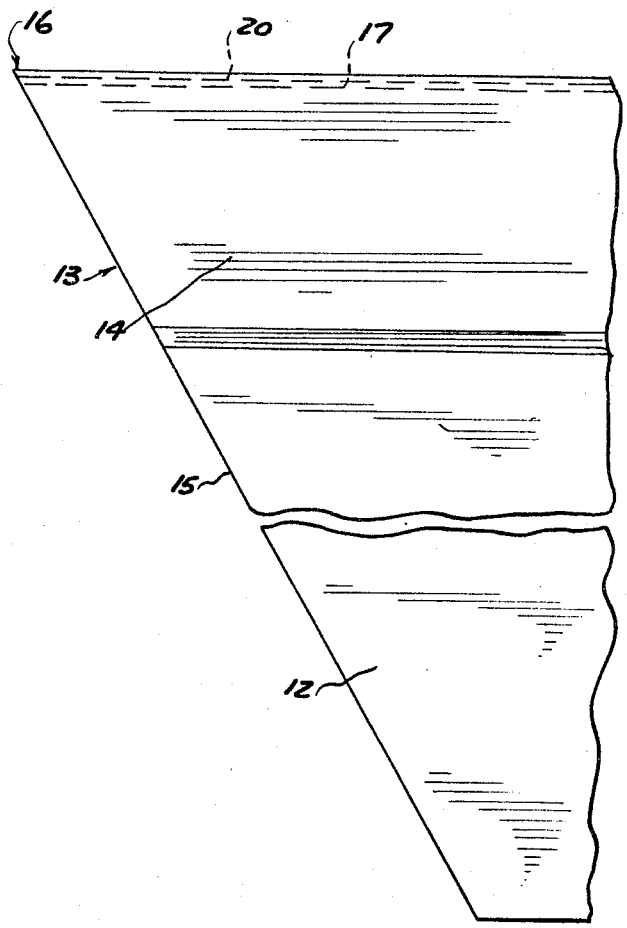
FIG. 2 is a fragmentary side elevational view thereof.

The opposing side walls of the head 13 are inwardly tapered, being hollow ground as shown at 14, FIG. 1, so that the head is of greater width at its upper portion adjacent the cutting head than that at other portions in the head herebelow, the entire head itself being of greater width than the body 12.

The tapered or hollow ground surfaces 14 on opposite sides of the head converge towards the body to provide for increased amount of clearance as the blade is fed into the opposed surfaces of a work being severed, such as shown in FIG. 3, and for reducing friction, and for minimizing impacting of chips.

The forward end of the body, including the head portion, is cut away rearwardly at 15 with said cut extending downwardly and, thus, defining in the upper corner portion of the head a leading transverse cutting edge 16, which extends across the head of the cut off blade and in accordance with the present invention is of a pre-determined cross-sectional shape best shown in FIG. 1. This pre-formed cutting suface, FIG. 1, is of uniform shape or cross-section throughout the entire length of the head and includes a pair of opposed outer hollow ground portions 17 gradually increasing depth toward the head axis to, thus define a pair of outer cutting corners 18.

The leading transverse cutting edge also includes an upright center section 19, which has a hollow ground or concave surface 20 which extends downwardly into the head at a gradually increasing depth toward the central portion thereof which depth at the center is less than the maximum depth of the outer portions 17 adjacent the central section.

The central section 19 includes a pair of substantially radial side walls which are substantially parallel to the body axis to thus define at the end of the center section an additional pair of cutting points 21, which cutting points are substantially coplanar with cutting points 18.

Thus the two surfaces 17 and the surface 20 are hollow ground or curved to provide in the work being cut three cutting chips, each of which will have a corresponding curve and which upon the application of a certain amount of cutting heat, tend to curl for ejection from the groove being cut in the workpiece W.

While in FIG. 1 side edges adjacent cutting points 21 forming a part of the center section 19 are perfectly upright and substantially parallel to the tool axis, it is contemplated that said side edges may be inclined within the range of 30 to 45° and still produce an effective cutting tool.

The primary and important factor is that the four cutting points 18 and 21 are substantially coplanar.

By providing hollow ground surfaces 17 and 20, which are curved, and for producing a curved chip which tends to curl up on heating, rather than a flat chip, harmful heating up of the tool is minimized or entirely eliminated.

In the prior art where the cutting surface was perfectly flat, a flat chip was produced which expanded in the cut so that the deeper the cut the more force it took to force the expanded chip out of the cut, thus, providing increased friction and increased heating. Such extreme chip friction, in turn, was passed onto the cutting edges of the blade, particularly the cutting corners, for causing a breakdown. In the conventional constructions the two outer cutting points or edges carried the maximum amount of heat from this cutting action and broke down first, requiring regrinding of the tool and unnecessary wear.

The present invention in the new form of the cutting surface eliminates most of the chip friction, if not all, which chip friction is tremendously destructive in the cut off operation or in other operations employing the present tool with the result that the tool lasts considerably longer.

In the present construction as compared with the prior art, you are dispelling through four points, namely the points 18 and 21, rather than two points, thus considerably reducing the opportunity of the tool to breakdown through the heat caused by friction.

With the production of three separate chips as shown in FIG. 3, there is practically no chip friction and therefore a minimum of harmful heating.

The four cutting points designated at 18 and 21 thus lie in the same plane and in the cutting action are slightly ahead of the corresponding low points of the surfaces 17 and 20, to thus provide for an improved and better cutting action. Thus, it is seen that the center section 19 is cutting separately from the two outer sections 17 to thus produce three chips, three separate and independent self-curling chips.

The present construction thus allows for heavier cuts, heavier feeds, provides for less breakage, narrow cuts where desired, a savings of material, and a considerable saving in down time.

Having described my invention reference should now be had to the following claims.

1. A cutting-off blade comprising an elongated body of uniform cross-section;
   a head of uniform cross-section extending along one side of the body throughout its length;
   said head being of greater width than said body;
   the forward end of said body from said head being cut away rearwardly and downwardly defining a leading transverse cutting edge across its forward extremity;
   and a pre-formed cutting surface formed in the outer edge face of said head of uniform shape throughout its length;
   the cross-sectional form of said cutting surface including a pair of opposed outer hollow ground portions of gradually increasing depth towards the head axis defining a pair of outer cutting corners;
   and an upright center section including a concave, hollow ground top surface which extends downwardly into the head at a gradually increasing depth to the center portion;
   to a depth less than the maximum depth of said outer portion;
   the center section including a pair of radial side walls substantially parallel to the body axis defining in said head at the end of said center section an additional pair of cutting points substantially coplanar with said first pair of cutting points.

2. In the cutting-off blade of claim 1, the opposite side walls of the head converging toward the body.

3. In the cutting-off blade of claim 1, the outer portions of said cutting edge and the top portion of said center section being curved defining in the cut-into workpiece along the cutting edge three individual and independent and curved chips, which curl on heating for reduced friction and ejection from the groove cut in the workpiece.

4. In the cutting-off blade of claim 1, the side walls of said center section being inclined downwardly and outwardly in the range of 30–45° from the vertical.

References Cited by the Examiner
UNITED STATES PATENTS

| | | | |
|---|---|---|---|
| 2,424,473 | 7/1947 | Lvers | 29—95 |
| 2,688,791 | 9/1954 | Lvers | 29—95 |
| 2,891,300 | 6/1959 | Shephard | 29—95 |

WILLIAM W. DYER, Jr., *Primary Examiner.*

HARRISON L. HINSON, *Examiner.*